(12) United States Patent
Oliva

(10) Patent No.: US 9,940,850 B1
(45) Date of Patent: Apr. 10, 2018

(54) INTERACTIVE FIRE SAFETY EDUCATION KIT AND ASSOCIATED USE THEREOF

(71) Applicant: Christopher Oliva, New City, NY (US)

(72) Inventor: Christopher Oliva, New City, NY (US)

( * ) Notice: Subject to any disclaimer, the term of this patent is extended or adjusted under 35 U.S.C. 154(b) by 275 days.

(21) Appl. No.: 14/989,836

(22) Filed: Jan. 7, 2016

(51) Int. Cl.
| | | |
|---|---|---|
| *G09B 19/00* | (2006.01) | |
| *G09B 25/00* | (2006.01) | |
| *G09B 25/04* | (2006.01) | |
| *G09B 9/00* | (2006.01) | |
| *A63H 17/08* | (2006.01) | |
| *A63H 17/10* | (2006.01) | |

(52) U.S. Cl.
CPC ............ *G09B 25/00* (2013.01); *A63H 17/08* (2013.01); *A63H 17/10* (2013.01); *G09B 9/00* (2013.01); *G09B 25/04* (2013.01)

(58) Field of Classification Search
USPC ................................. 434/219, 226
See application file for complete search history.

(56) References Cited

U.S. PATENT DOCUMENTS

| 5,173,052 A * | 12/1992 | Duncan, Jr. ........ | A62C 99/0081 296/168 |
| 5,275,571 A * | 1/1994 | Musto ................ | A62C 99/0081 434/219 |
| 5,752,835 A * | 5/1998 | Whitmer, Sr. ........... | G09B 9/00 434/226 |
| 6,048,208 A * | 4/2000 | Hoover ................ | G09B 23/188 434/224 |
| 6,129,552 A * | 10/2000 | Deshoux ............ | A62C 99/0081 434/226 |
| 6,790,146 B2 * | 9/2004 | Comand .................. | A63G 1/30 273/349 |
| 7,008,230 B2 * | 3/2006 | Hoglund ................ | G09B 19/00 434/219 |

* cited by examiner

*Primary Examiner* — Kurt Fernstrom
(74) *Attorney, Agent, or Firm* — Ashkan Najafi

(57) ABSTRACT

An interactive fire safety education kit includes a frame having a first section, a second section conjoined to the first section, and a third section conjoined to the second section. A first fire-simulating mechanism is rotatably coupled to the first section, a second fire-simulating mechanism adjustably coupled to the second section, and a third fire-simulating mechanism rotatably coupled to the third section. A flag and an associated mechanism are provided wherein the mechanism is capable of reciprocating the flag along a vertical path located adjacent to the third section as the third fire-simulating mechanism rotates in opposing rotational directions. A user interface is provided wherein the user interface is capable of generating an output that causes selective rotational displacement of the first fire-simulating mechanism, selective linear displacement of the second fire-simulating mechanism, and selective rotational displacement of the third fire-simulating mechanism, respectively.

15 Claims, 13 Drawing Sheets

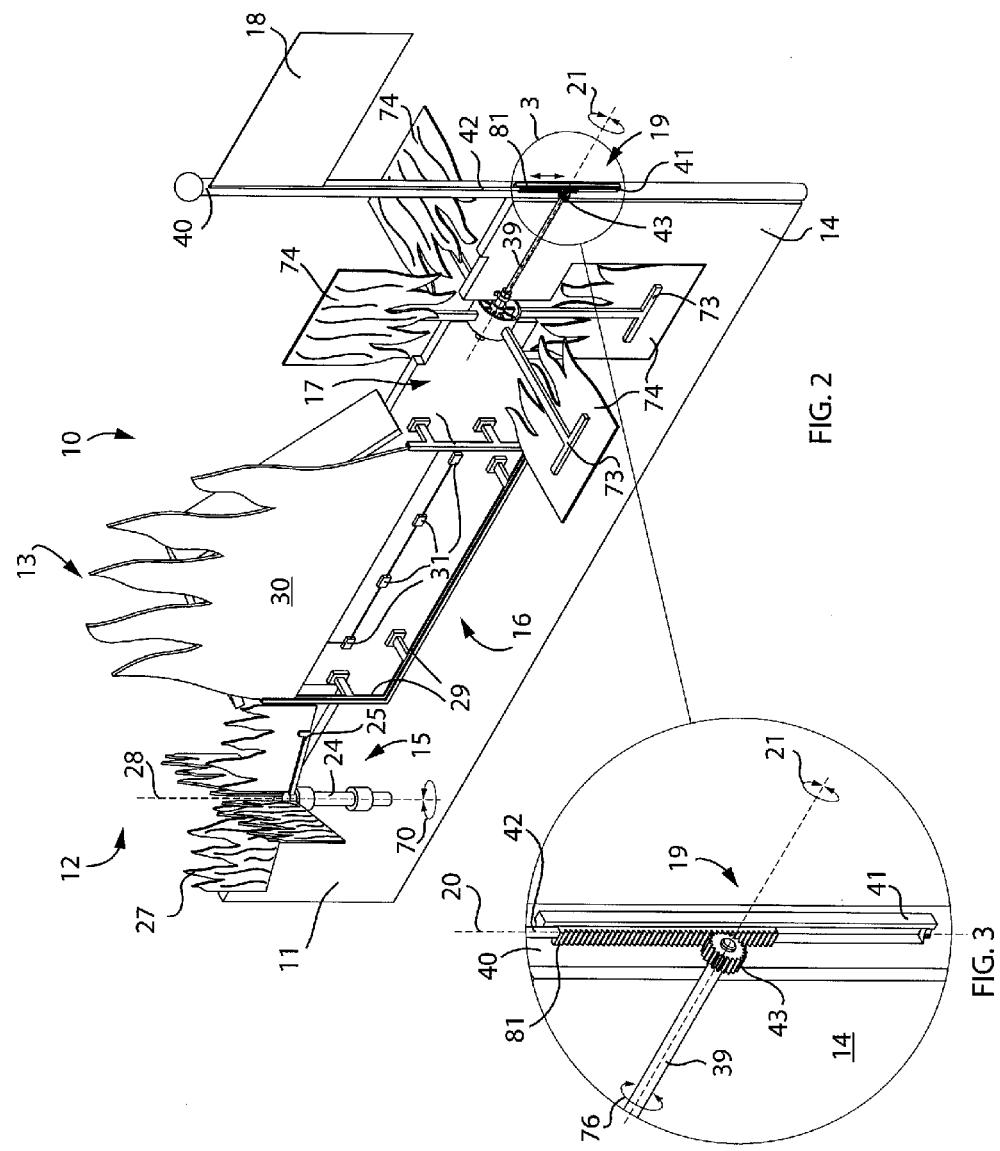

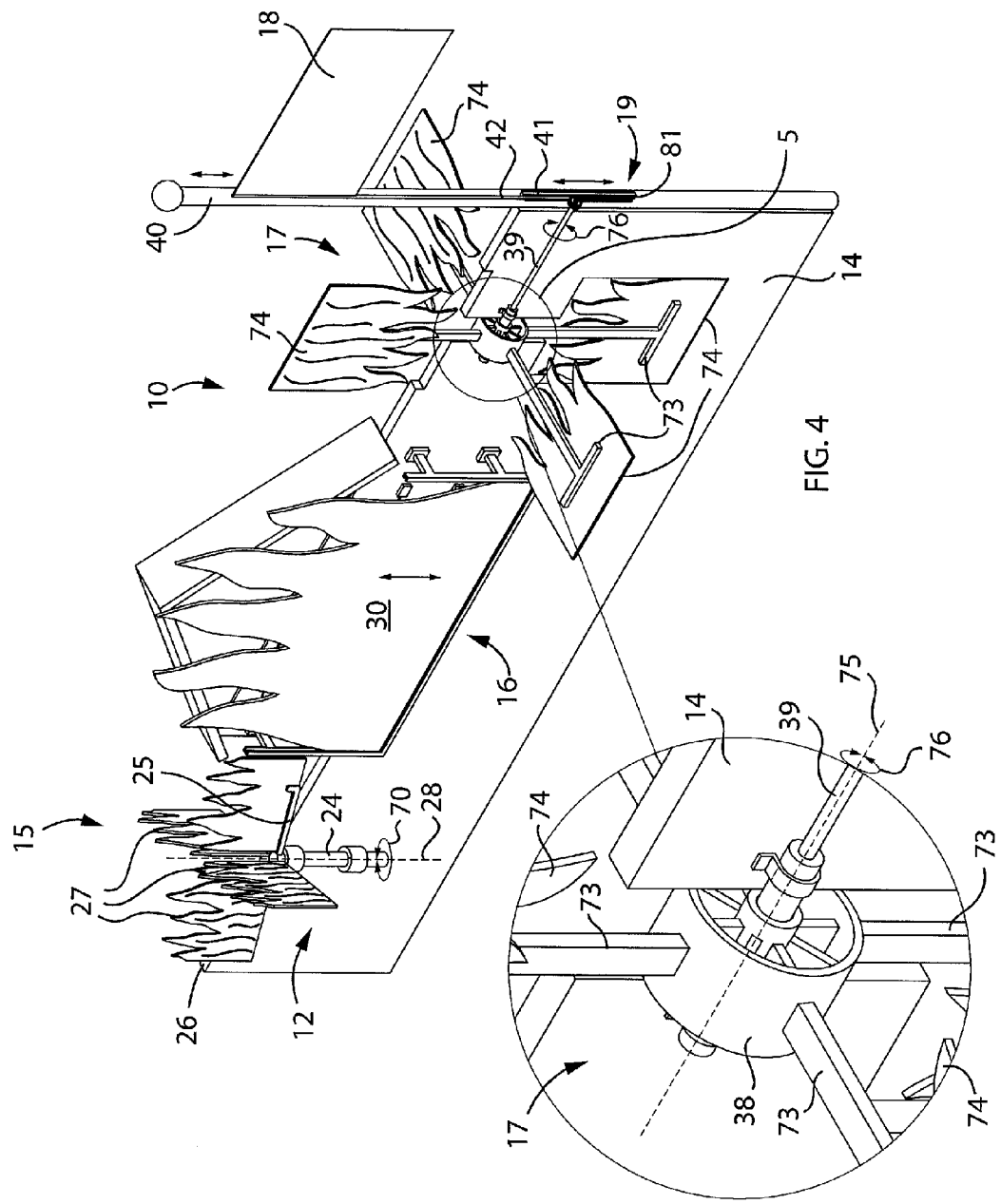

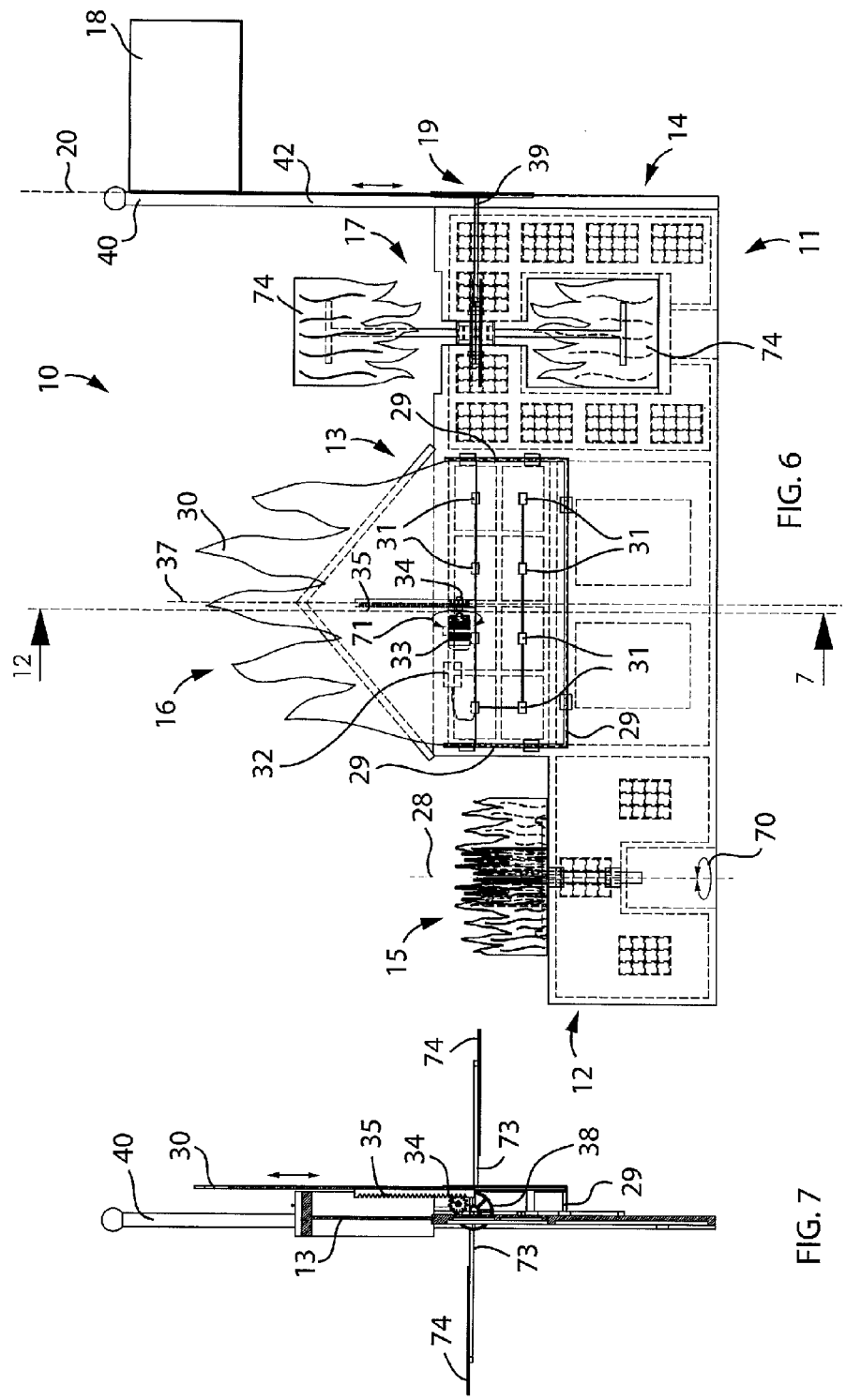

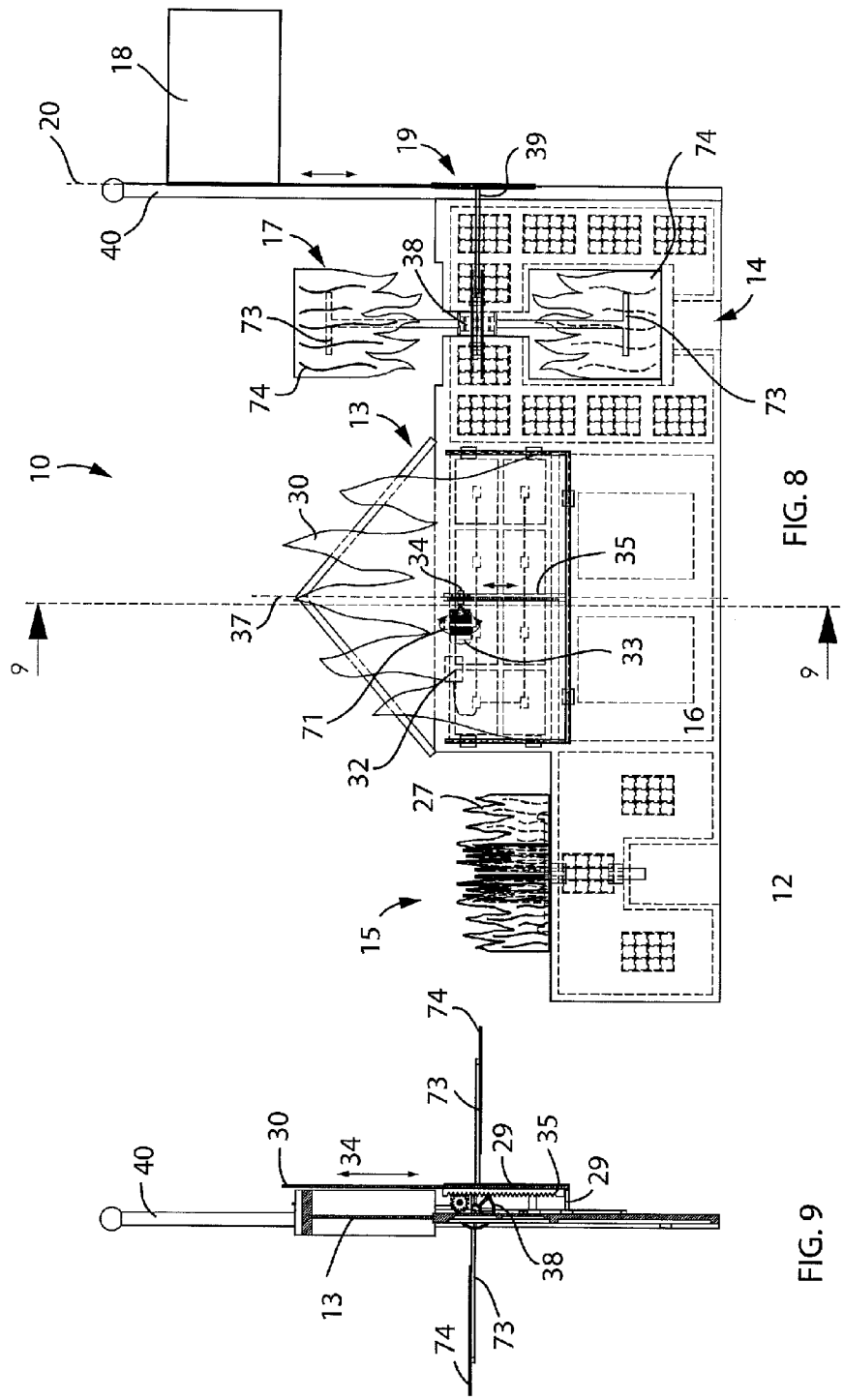

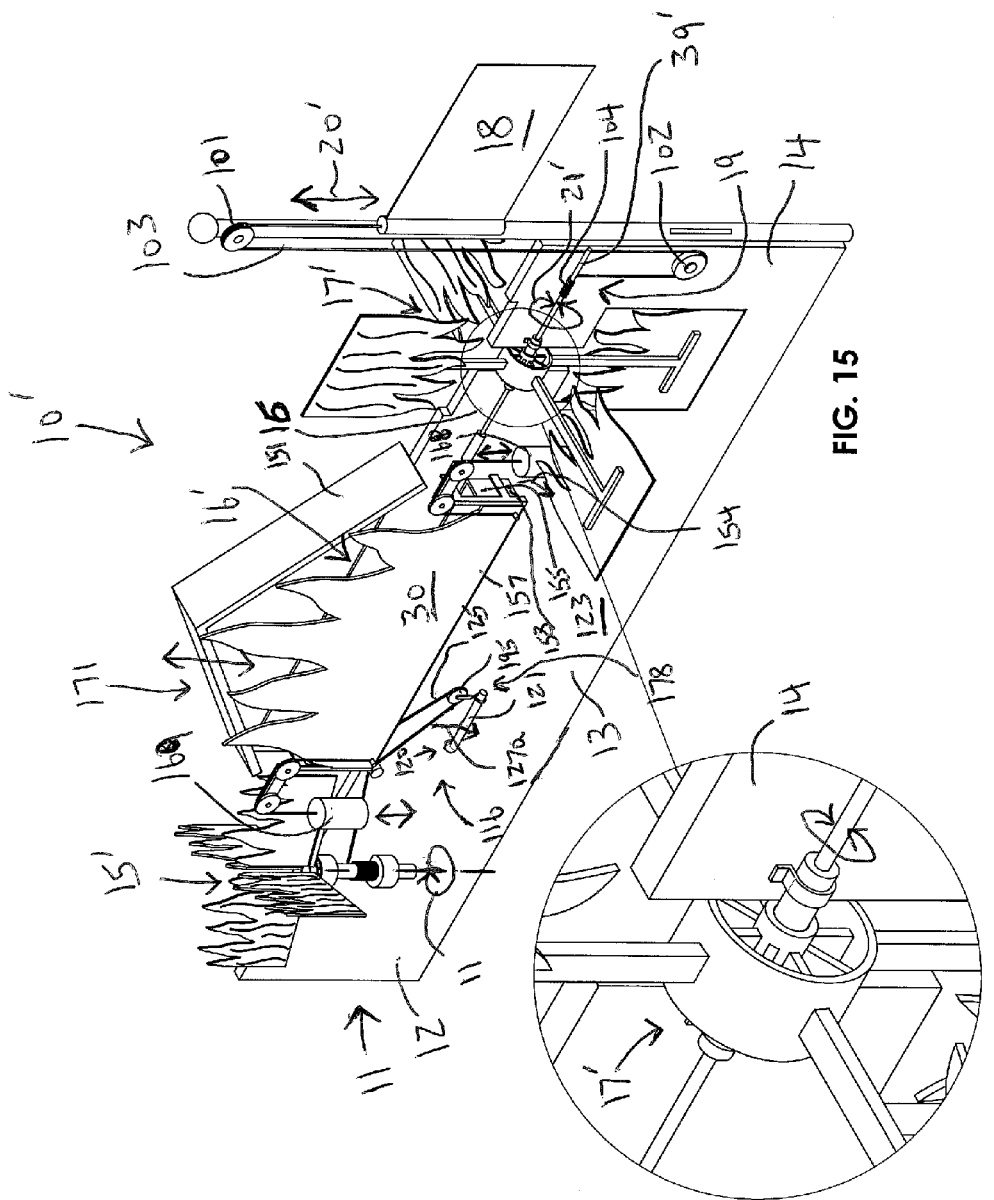

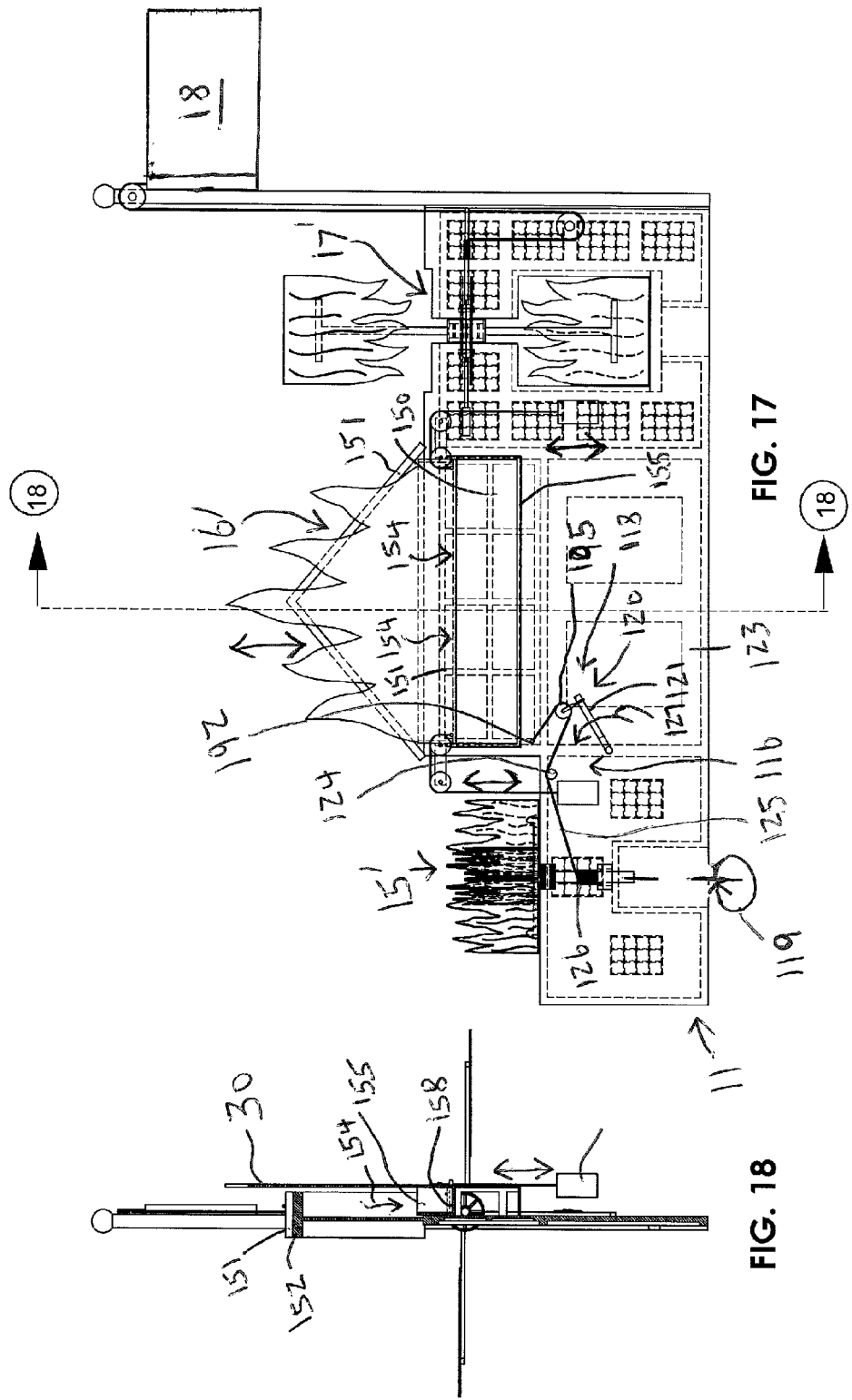

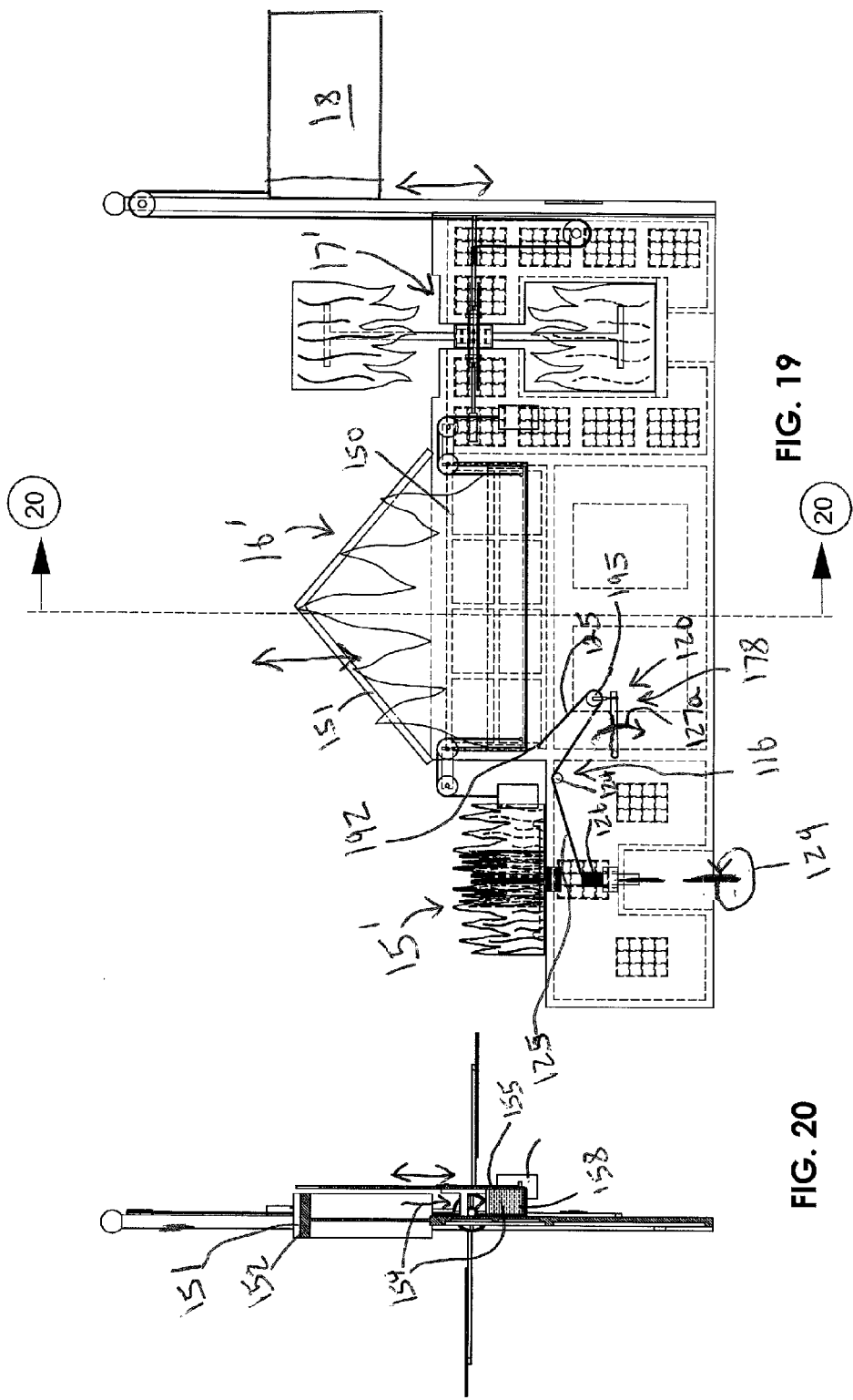

INTERACTIVE FIRE SAFETY EDUCATION KIT AND ASSOCIATED USE THEREOF

CROSS REFERENCE TO RELATED APPLICATIONS

Not applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

Technical Field

Exemplary embodiment(s) of the present disclosure relate to interactive educational kits and, more particularly, to a fire safety educational kit for use in interactively teaching children and adults about various aspects of fire safety.

Prior Art

A home fire is, undoubtedly, one of the most frightening scenarios one could ever imagine. The U.S. Fire Administration (USFA reported alarming statistics in 2010: for the year 2009, there were a reported 396,000 residential fires, resulting in 3,055 deaths and 13,825 injuries. Even more distressing, fatal residential structure fires with working smoke alarms totaled 391 during this period, resulting in 452 civilian fire fatalities. Each year an unacceptable number of American citizens lose their lives in residential structure fires where smoke alarms operated, prompting the USFA to diligently investigate the characteristics of the victims of these fires to better educate the public in taking preventative measures to reduce the risks involved with such fires. In most areas of the country, local fire departments offer regular educational sessions to those who are most vulnerable to the dangers of fires, young children.

Free of charge, fire safety educators from these departments conduct training and provide lectures and fire safety demonstrations in elementary schools, addressing the common causes of fire and fire injuries in the home, as well as providing information on how to prevent fires and what to do in case of fire. Invaluable programs, "fire days" at schools are eagerly anticipated by children, as skilled firefighting educators infuse life-saving lessons with interesting activities that are just as fun as they are informative.

Accordingly, a need remains for an interactive fire safety education kit in order to overcome prior art shortcomings. The exemplary embodiment(s) satisfy such a need by providing an interactive and engaging method of educating children and adults about various aspects of fire safety that is convenient and easy to use, durable in design, versatile in its applications, and designed for saving lives by informing and educating children and adults about the importance of fire safety.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a fire safety educational kit for use in interactively teaching children and adults about various aspects of fire safety. These and other objects, features, and advantages of the non-limiting exemplary embodiment(s) are provided by an interactive fire safety education kit including a frame having a first section, a second section conjoined to the first section, and a third section conjoined to the second section. Notably, the first section, the second section and the third section are arranged in a side-by-side configuration. The interactive fire safety education kit further includes a first fire-simulating mechanism is rotatably coupled to the first section, a second fire-simulating mechanism adjustably coupled to the second section, and a third fire-simulating mechanism rotatably coupled to the third section. A flag and an associated mechanism are provided wherein the mechanism is capable of reciprocating the flag along a vertical path located adjacent to the third section as the third fire-simulating mechanism rotates in opposing rotational directions. Advantageously, a user interface is provided wherein the user interface is capable of generating an output that causes selective rotational displacement of the first fire-simulating mechanism, selective linear displacement of the second fire-simulating mechanism, and selective rotational displacement of the third fire-simulating mechanism, respectively. In this manner, a user is able to selectively start and extinguish fires as desired.

In a non-limiting exemplary embodiment, the mechanism capable of reciprocating the flag includes a support pole, a first pulley rotatably anchored to a top end of the support pole, a second pulley rotatably anchored to the frame and positioned below the first pulley, and a first rope having a proximal end rotatably engaged about a portion of the third fire-simulating mechanism. Such a first rope further has a distal end statically anchored to the flag, wherein the first rope rotatably engages each of the first pulley and the second pulley. In this manner, opposite rotational movements of the portion of the third fire-simulating mechanism about a first horizontal axis causes the first rope to wind and unwind thereabout, respectively, such that the flag is raised and lowered along a first vertical path relative to the first horizontal axis.

In a non-limiting exemplary embodiment, the user interface includes a portable toy fire truck including a water pump, a reservoir adapted to contain water and being in communication with the water pump, and a discharge nozzle in communication with the reservoir. Advantageously, the discharge nozzle selectively ejects fluid along a first fluid path, a second fluid path and a third fluid path engaging the first fire-simulating mechanism, the second fire-simulating mechanism, and the third fire-simulating mechanism, respectively. In this manner, the user interface actuates selective movement of the first fire-simulating mechanism, the second fire-simulating mechanism, and the third fire-simulating mechanism, respectively.

In a non-limiting exemplary embodiment, the interactive fire safety education kit further includes a ladder attached to the portable toy fire truck, and a ladder-extending mechanism capable of selectively displacing the ladder to a raised position as the third fire-simulating mechanism is caused to spin in a first rotational direction. Such a ladder-extending mechanism includes a lever having a posterior section disposed at a rear face of the frame and an anterior section disposed at a front face of the frame, wherein the anterior section is coupled to the ladder.

In a non-limiting exemplary embodiment, the ladder-extending mechanism further includes a third pulley dynamically disposed at the rear face of the frame and mated to the posterior section of the lever, a fourth pulley rotatably anchored at the rear face of the frame, and a second rope having a proximal end rotatably anchored to the first fire-simulating mechanism. Such a second rope further has a distal end statically anchored to the rear face of the frame such that the second rope is rotatably engaged with the third pulley and the third fourth. Advantageously, the proximal end of the second rope is caused to wind about the first fire-simulating mechanism when the first fire-simulating mechanism is caused to rotate in the first rotational direction and thereby causes the lever and the ladder to synchronously articulate upward towards raised positions, respectively. Conversely, the proximal end of the second rope is caused to unwind about the first fire-simulating mechanism when the first fire-simulating mechanism is caused to rotate in an opposite second rotational direction and thereby causes the lever and the ladder to synchronously articulate downward towards lowered positions, respectively.

In a non-limiting exemplary embodiment, the second section includes a plurality of windows, and a rubber flap positioned over an outer layer of the second section for directing the fluid downwardly along a rear face of the windows.

In a non-limiting exemplary embodiment, the second fire-simulating mechanism is positioned at the second section of the frame. Such a second fire-simulating mechanism includes a trough in fluid communication with the rubber flap and affixed to a base of the second section wherein the trough has a weep hole for permitting the fluid to slowly egress therefrom. A second fire-simulating panel is fixedly connected to the trough and extends upwardly therefrom along a substantially vertical plane adjacent to the second section. In this manner, fluid is caused to pass through the windows and travel along the rubber flap until the fluid is stored into the trough.

In a non-limiting exemplary embodiment, the second fire-simulating mechanism further includes a third rope and a fourth rope each having a corresponding proximal end statically affixed to the trough, a first set of pulleys and a second set of pulleys each rotatably supported at the rear face of the frame, and a first weight member and a second weight member statically affixed to a corresponding distal end of the third rope and the fourth rope, respectively. In this manner, the second fire-simulating panel is at a lowered position when a weight of the fluid stored in the trough is greater than a combined weight of the first weight member and the second weight member such that the first weight member and the second weight member are raised to a height generally equal to the trough. Conversely, the second fire-simulating panel is at a raised position when the weight of the fluid stored in the trough is less than the combined weight of the first weight member and the second weight member such that the first weight member and the second weight member are lowered to a height below the trough.

The present disclosure further includes a method of utilizing an interactive fire safety education kit. Such a method includes the steps of: providing a frame including a first section, a second section conjoined to the first section, and a third section conjoined to the second section, wherein the first section, the second section and the third section are arranged in a side-by-side configuration; providing and rotatably coupling a first fire-simulating mechanism to the first section; providing and adjustably coupling a second fire-simulating mechanism to the second section; providing and rotatably coupling a third fire-simulating mechanism to the third section.

The method further includes the steps of: providing a flag; providing a mechanism capable of reciprocating the flag; and providing a user interface. The method steps continue by the user interface generating an output that causes selective rotational displacement of the first fire-simulating mechanism, selective linear displacement of the second fire-simulating mechanism, and selective rotational displacement of the third fire-simulating mechanism, respectively; and the mechanism reciprocating the flag along a vertical path located adjacent to the third section as the third fire-simulating mechanism rotates in opposing rotational directions.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 2 is a rear perspective view of the interactive fire safety education kit illustrated in FIG. 1, wherein the flag is fully raised;

FIG. 3 is an enlarged perspective view of the mechanism for raising and lowering the flag;

FIG. 4 is a rear perspective view of the interactive fire safety education kit illustrated in FIG. 1, wherein the flag is partially lowered;

FIG. 5 is an enlarged perspective view of the third fire-simulating mechanism;

FIG. 6 is a front elevational view of the interactive fire safety education kit illustrating the interrelationship between the electronic components of the second fire-simulating mechanism, wherein the fire simulating panel is located at a raised position;

FIG. 7 is a cross-sectional view taken along line 7-7 in FIG. 6 of the second fire-simulating mechanism;

FIG. 8 is a front elevational view of the interactive fire safety education kit illustrating the interrelationship between the electronic components of the second fire-simulating mechanism, wherein the fire simulating panel is located at a lowered position;

FIG. 9 is a cross-sectional view taken along line 9-9 in FIG. 8 of the second fire-simulating mechanism;

FIG. 15 is a rear perspective view of the interactive fire safety education kit illustrated in FIG. 12 each of the ladder, the flag, and the second fire-simulating mechanism are displaced to lowered positions, respectively;

FIG. 16 is an enlarged view of a portion of a third fire-simulating mechanism identified in section 16 and taken in FIG. 15;

FIG. 17 is a rear elevational view of the interactive fire safety education kit illustrated in FIG. 11 wherein nonvisible structures are shown in hidden lines to illustrate the structural interrelationship between the front of the frame and the multiple fire-simulating mechanisms;

FIG. 18 is a cross-sectional view taken along line 18-18, as shown in FIG. 17;

FIG. 19 is a rear elevational view of the interactive fire safety education kit illustrated in FIG. 12 wherein nonvisible structures are shown in hidden lines to illustrate the structural interrelationship between the front of the frame and the multiple fire-simulating mechanisms; and FIG. 20 is a cross-sectional view taken along line 20-20, as shown in FIG. 19.

Figure 1:
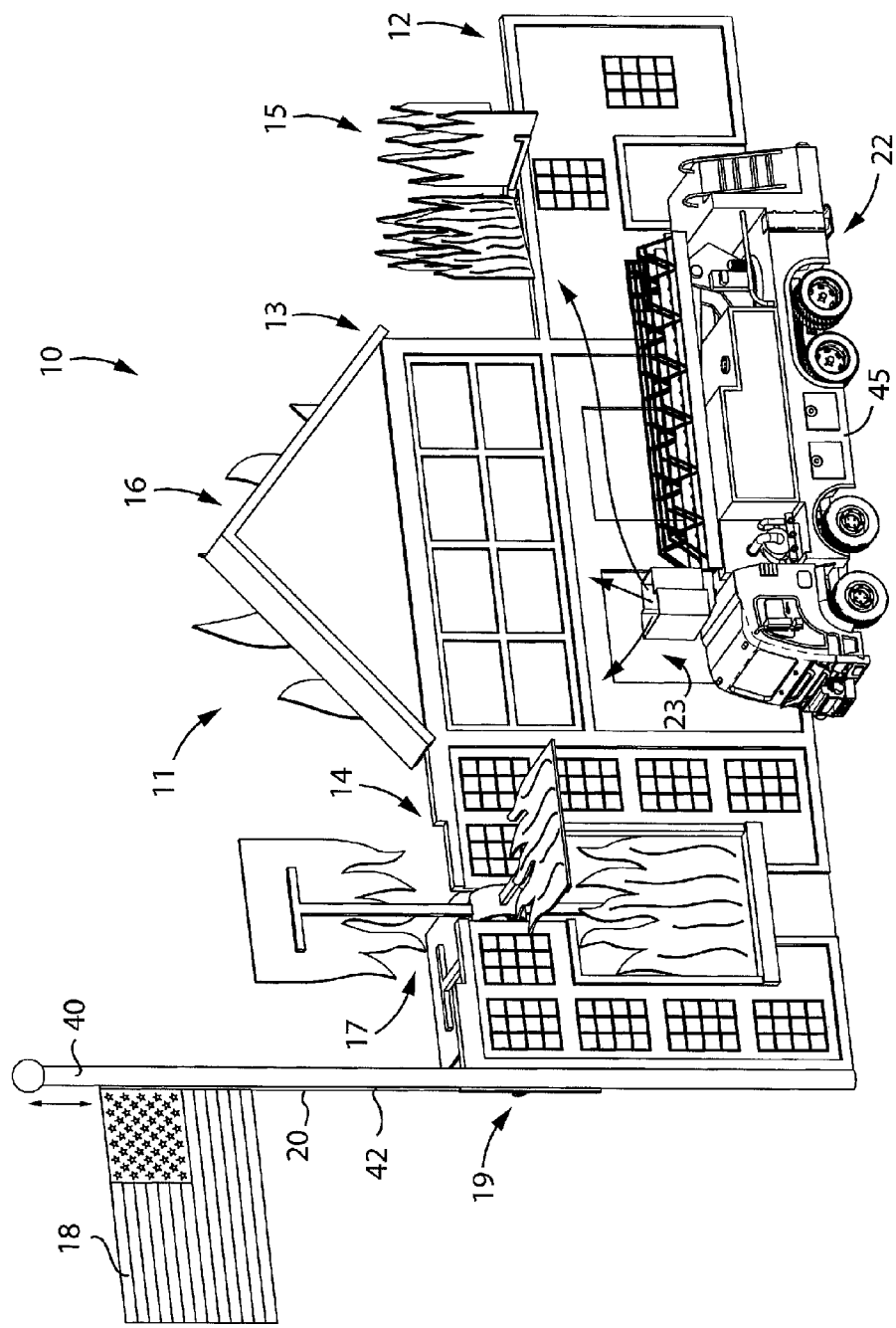
FIG. 1 is a front perspective view of an interactive fire safety education kit, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 10:
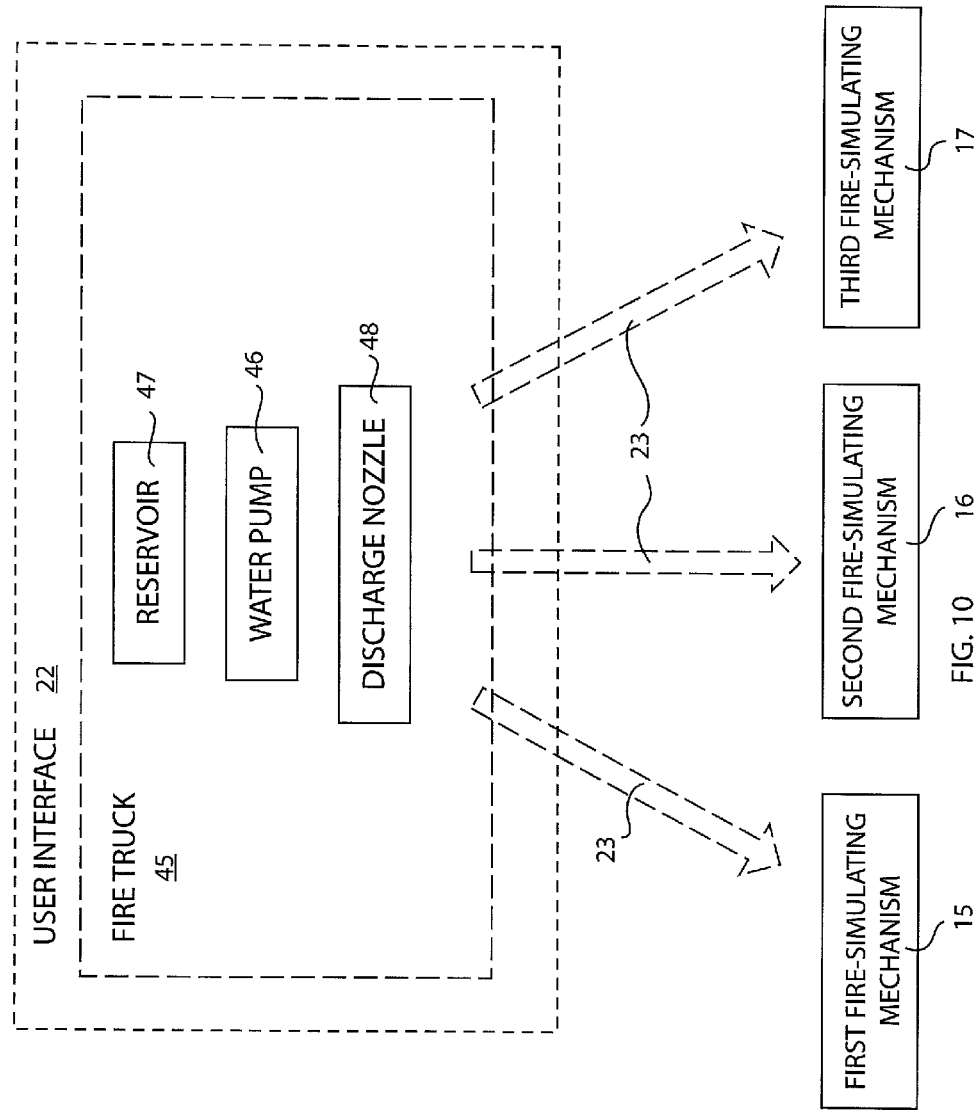
FIG. 10 is a schematic diagram illustrating the interrelationship between the major components of the user interface, in accordance with a non-limiting exemplary embodiment.
Figure 11:
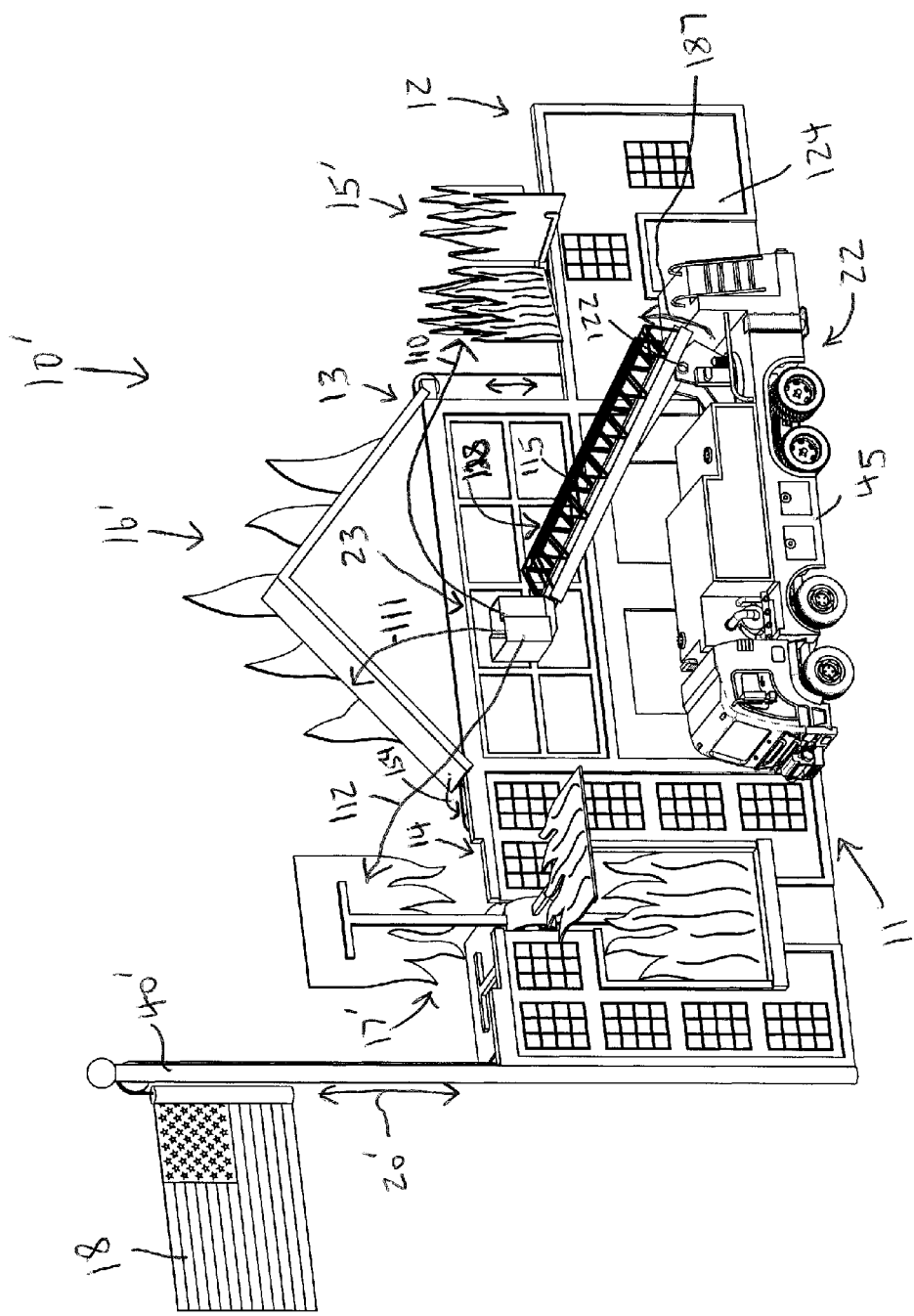
FIG. 11 is a front perspective view of another interactive fire safety education kit showing a flag and a second fire-simulating mechanism at raised positions, respectively, in accordance with another non-limiting exemplary embodiment.
Figure 12:
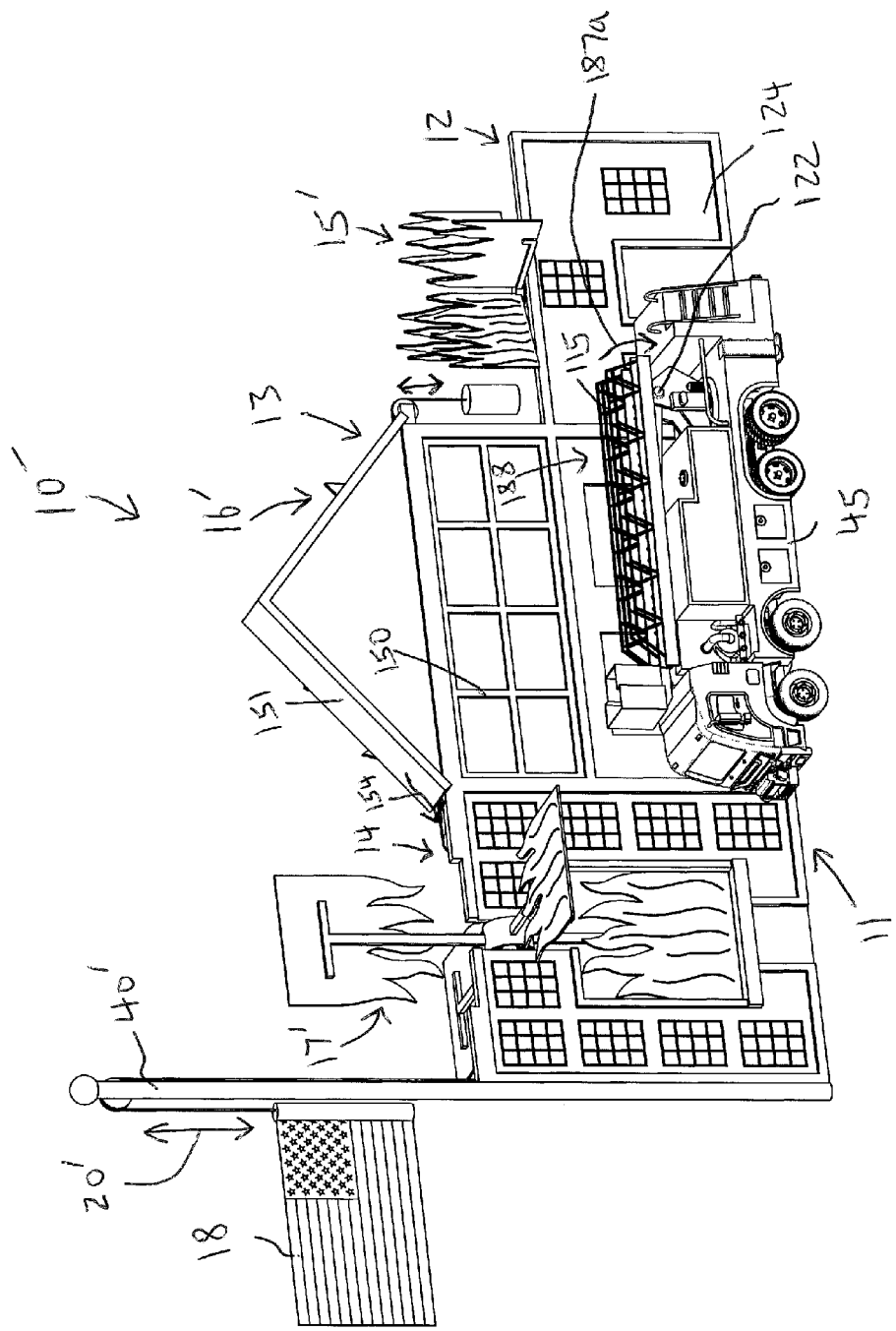
FIG. 12 is a front perspective view of the interactive fire safety education kit illustrated in FIG. 11 wherein the flag, the second fire-simulating mechanism and a ladder are at lowered positions, respectively.
Figure 13:
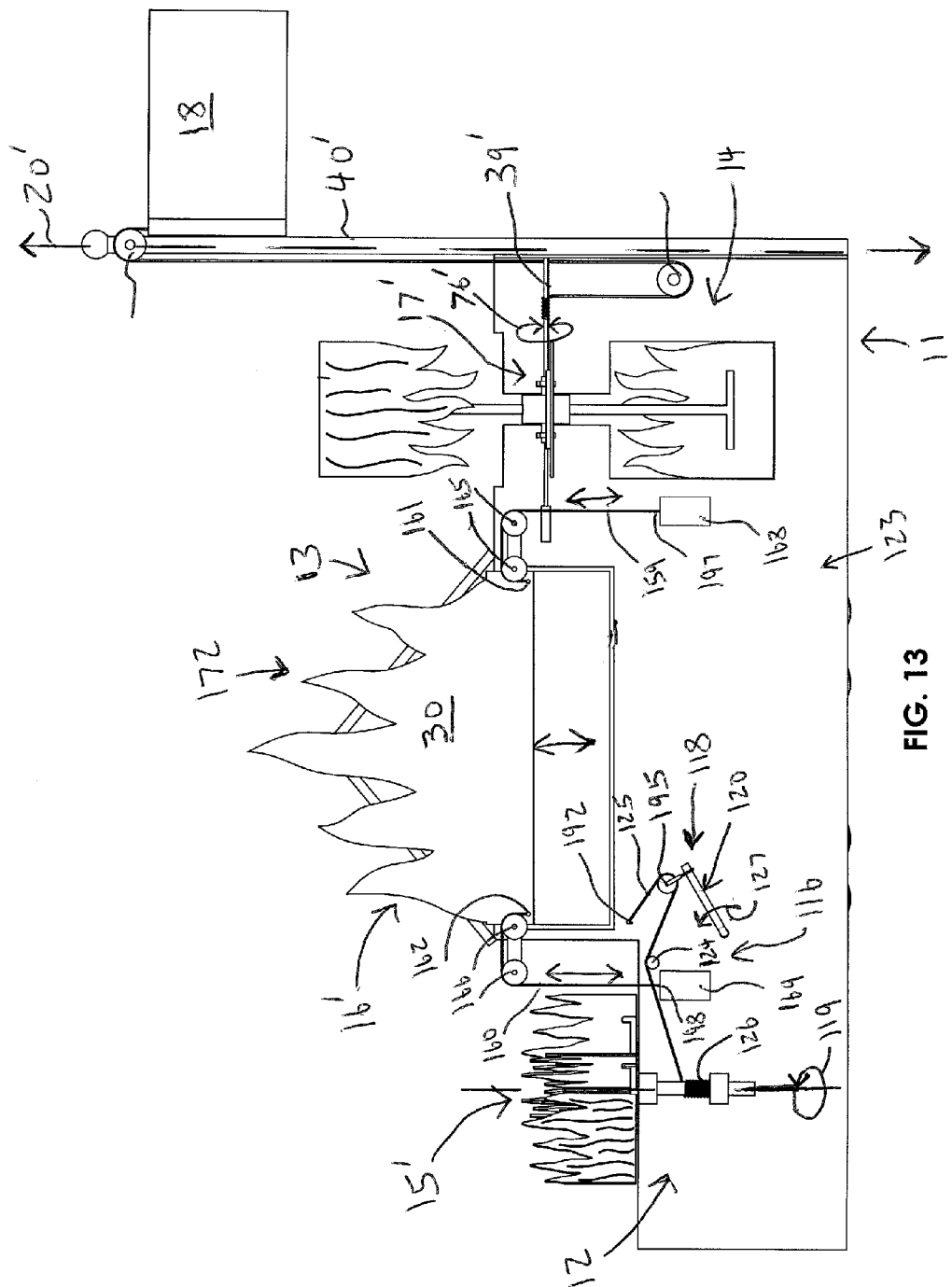
FIG. 13 is a rear elevational view of the interactive fire safety education kit illustrated in FIG. 12 wherein each of the ladder, the flag, and the second fire-simulating mechanism are displaced to raised positions, respectively.
Figure 14:
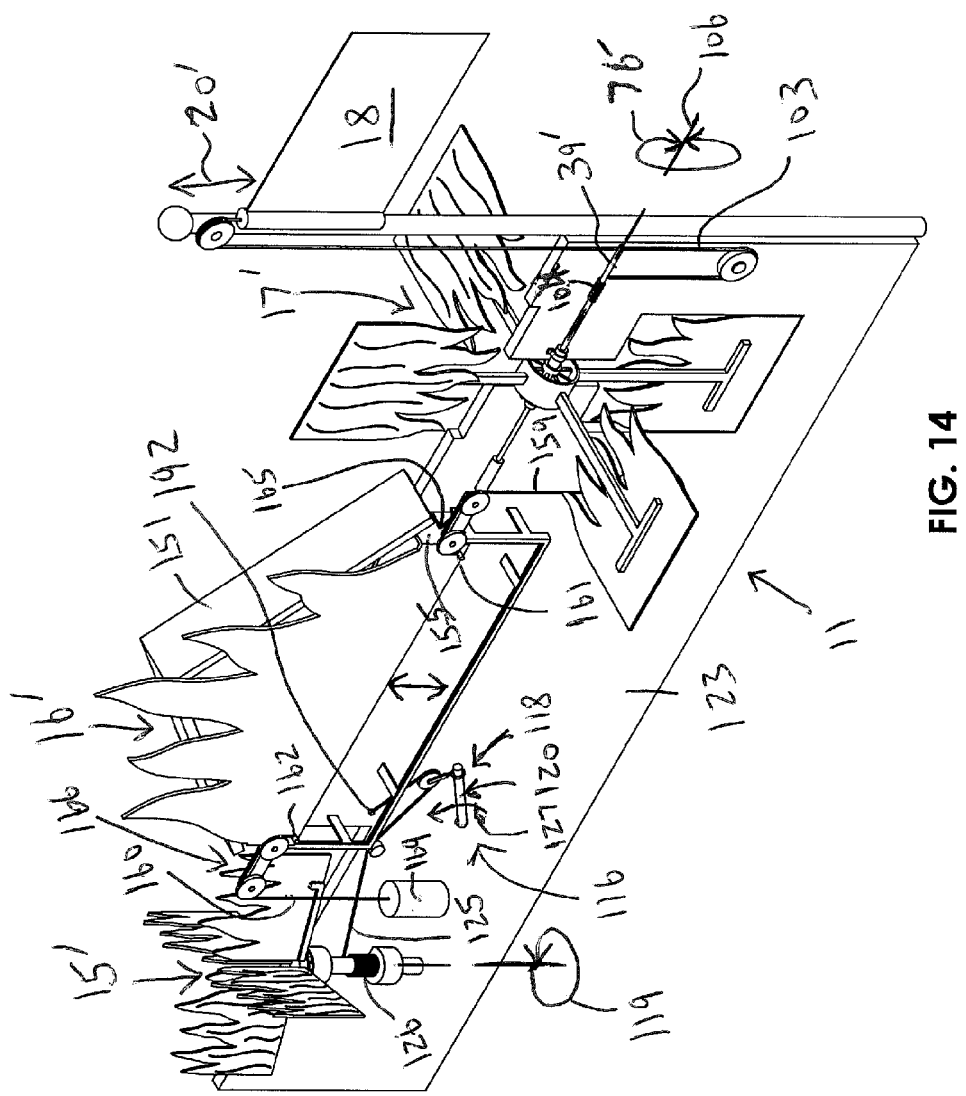
FIG. 14 is a rear perspective view of the interactive fire safety education kit illustrated in FIG. 13 each of the ladder, the flag, and the second fire-simulating mechanism are displaced to raised positions, respectively.

The non-limiting exemplary embodiment(s) is/are referred to in FIGS. 1-20 and is/are intended to provide an interactive fire safety education kit (collectively at 10, 10'). A non-limiting first embodiment 10 is illustrated in FIGS. 1-10 and a non-limiting second embodiment 10' is illustrated in FIGS. 10-20.

Referring initially to FIGS. 1-10, the interactive fire safety education kit 10 includes a frame 11 including a first section 12, a second section 13 conjoined to the first section 12, and a third section 14 conjoined to the second section 13, wherein the first section 12, the second section 13 and the third section 14 are arranged in a side-by-side configuration. The kit 10 further includes a first fire-simulating mechanism 15 rotatably coupled to the first section 12, a second fire-simulating mechanism 16 adjustably coupled to the second section 13, a third fire-simulating mechanism 17 rotatably coupled to the third section 14, a flag 18, a mechanism 19 for reciprocating the flag 18 along a vertical path 20 located adjacent to the third section 14 as the third fire-simulating mechanism 17 rotates in opposing rotational directions 21, and a user interface 22 for generating an output 23 that causes selective displacement of the first fire-simulating mechanism 15, the second fire-simulating mechanism 16, and the third fire-simulating mechanism 17, respectively.

In a non-limiting exemplary embodiment, the first fire-simulating mechanism 15 includes a dowel 24 rotatably coupled to the first section 12, a plurality of first stabilizing bars 25 statically affixed to the dowel 24 and radially extending away therefrom along a top edge 26 of the first section 12, a plurality of first fire-simulating panels 27 statically connected to the first stabilizing bars 25, respectively. In this manner, when the output 23 contacts at least one of the first fire-simulating panels 27, the first stabilizing bars 25 and the first fire-simulating panels 27 synchronously rotate, about a first vertical axis 28, in clockwise and counter clockwise directions 70.

In a non-limiting exemplary embodiment, the second fire-simulating mechanism 16 includes a plurality of second stabilizing bars 29 located at a rear side of the second section 13, a second fire-simulating panel 30 adjustably engaged with the second stabilizing bars 29, a plurality of sensors 31 affixed to the rear side of the second section 13, a controller 32 in communication with the sensors 31, a motor 33 in communication with the controller 32 and having a drive gear 34 extending outward therefrom, a track 35 in communication with the drive gear 34 and statically affixed to the second fire-simulating panel 30. Notably, upon detecting pressure at the second section 13, the sensors 31 generate and transmit a first notification signal to the controller 32. Alternately, upon detecting no pressure at the second section 13, the sensors 31 generate and transmit a second notification signal to the controller 32. In this manner, upon receiving the first notification signal and the second notification signal, the controller 32 causes the drive gear 34 to rotate in clockwise and counter clockwise rotational directions 71, respectively, thereby causing the track 35 and the second fire-simulating panel 30 to linearly reciprocate along a second vertical axis 37.

In a non-limiting exemplary embodiment, the third fire-simulating mechanism 17 includes a wheel 38 rotatably coupled to the third section 14, a drive shaft 39 statically anchored to the wheel 38 and laterally extending outward towards the mechanism 19 for reciprocating the flag 18, a plurality of third stabilizing bars 73 statically affixed to an outer circumferential surface of the wheel 38 and radially extending way therefrom, and a plurality of third fire-simulating panels 74 statically connected to the third stabilizing bars 73, respectively. In this manner, when the output 23 contacts at least one of the third fire-simulating panels 74, the third stabilizing bars 73 and the third fire-simulating panels 74 synchronously rotate 76 in clockwise and counter clockwise directions, about a horizontal axis 75. It is noted that rotational movements 76 and 21 are co-axially created about horizontal axis 75.

In a non-limiting exemplary embodiment, the mechanism 19 for reciprocating a flag 18 includes a pinion 43 statically coupled to the drive shaft 39, a support pole 40 affixed to the third section 14, a guide track 41 statically connected to the support pole 40, a rack 81 slidably seated within the guide track 41 and engaged with the pinion 43, a rod 42 affixed to the guide track 41 and positioned along the support pole 40, the flag 18 being attached to distal end of the rod 42. In this manner, rotational movement 76 of the drive shaft 39 causes rotational movement 21 of the pinion 43 thereby linearly displacing both the rack 81 and the rod 42 along the vertical path 20 such that the flag 18 is raised and lowered along the support pole 40.

In a non-limiting exemplary embodiment, the user interface 22 includes a portable toy fire truck 45 including a water pump 46, a reservoir 47 adapted to contain water and being in communication with the water pump 46, and a discharge nozzle 48 in communication with the reservoir 47. In this manner, the discharge nozzle 48 selectively ejects fluid (e.g., output 23) towards the first fire-simulating mechanism 15, the second fire-simulating mechanism 16, and the third fire-simulating mechanism 17.

The present disclosure further includes a method of utilizing an interactive fire safety education kit 10. Such a method includes the steps of: providing a frame 11 including a first section 12, a second section 13 conjoined to the first section 12, and a third section 14 conjoined to the second section 13 such that the first section 12, the second section 13 and the third section 14 are arranged in a side-by-side configuration; providing and rotatably coupling a first fire-simulating mechanism 15 to the first section 12; providing and adjustably coupling a second fire-simulating mechanism 16 to the second section 13; and providing and rotatably coupling a third fire-simulating mechanism 17 to the third section 14.

The method further includes the steps of: providing a flag 18; providing a mechanism 19 for reciprocating the flag 18; providing a user interface 22; the user interface 22 generating an output 23 and thereby causing selective displacement of the first fire-simulating mechanism 15, the second fire-simulating mechanism 16, and the third fire-simulating mechanism 17, respectively; and rotating the third fire-simulating mechanism 17 in opposing rotational directions 21, and thereby reciprocating the flag 18 along a vertical path 20 located adjacent to the third section 14.

Now referring initially to FIGS. 10-20, another embodiment of present disclosure is illustrated as an interactive fire safety education kit 10' including a frame 11 having a first section 12, a second section 13 conjoined to the first section 12, and a third section 14 conjoined to the second section 13. Notably, the first section 12, the second section 13 and the third section 14 are arranged in a side-by-side configuration. The interactive fire safety education kit 10' further includes a first fire-simulating mechanism 15' is rotatably coupled to the first section 12, a second fire-simulating mechanism 16' adjustably coupled to the second section 13, and a third fire-simulating mechanism 17' rotatably coupled to the third section 14. A flag 18 and an associated mechanism 19' are provided wherein the mechanism 19' is capable of reciprocating the flag 18 along a vertical path 20' located adjacent to the third section 14 as the third fire-simulating mechanism 17' rotates in opposing rotational directions 21'. Advantageously, a user interface 22 is provided wherein the user interface 22 is capable of generating an output 23 that causes selective rotational displacement of the first fire-simulating mechanism 15', selective linear displacement of the second fire-simulating mechanism 16', and selective rotational displacement of the third fire-simulating mechanism 17', respectively. In this manner, a user is able to selectively start and extinguish fires as desired.

In a non-limiting exemplary embodiment, the mechanism 19' capable of reciprocating the flag 18 includes a support pole 40', a first pulley 101 rotatably anchored to a top end of the support pole 40', a second pulley 102 rotatably anchored to the frame 11 and positioned below the first pulley 101, and a first rope 103 having a proximal end 104 rotatably engaged about a portion 39' of the third fire-simulating mechanism 17'. Such a first rope 103 further has a distal end 105 statically anchored to the flag 18, wherein the first rope 103 rotatably engages each of the first pulley 101 and the second pulley 102. In this manner, opposite rotational movements 76' of the portion 39' of the third fire-simulating mechanism 17' about a first horizontal axis 106 causes the first rope 103 to wind and unwind thereabout, respectively, such that the flag 18 is raised and lowered along a first vertical path 20' relative to the first horizontal axis 106.

In a non-limiting exemplary embodiment, the user interface 22 includes a portable toy fire truck 45 including a water pump 46, a reservoir 47 adapted to contain water and being in communication with the water pump 46, and a discharge nozzle 48 in communication with the reservoir 47. Advantageously, the discharge nozzle 48 selectively ejects fluid (e.g., output 23) along a first fluid path 110, a second fluid path 111 and a third fluid path 112 engaging the first fire-simulating mechanism 15', the second fire-simulating mechanism 16', and the third fire-simulating mechanism 17', respectively. In this manner, the user interface 22 actuates selective movement of the first fire-simulating mechanism 15', the second fire-simulating mechanism 16', and the third fire-simulating mechanism 17', respectively.

In a non-limiting exemplary embodiment, the interactive fire safety education kit 10' further includes a ladder 115 attached to the portable toy fire truck 45, and a ladder extending mechanism 116 capable of selectively displacing the ladder 115 to a raised position 128 as the third fire-simulating mechanism 17' is caused to spin in a first rotational direction 119. Such a ladder extending mechanism 116 includes a lever 120 having a posterior section 121 disposed at a rear face 123 of the frame 11 and an anterior section 122 disposed at a front face 124 of the frame 11, wherein the anterior section 122 is coupled to the ladder 115.

In a non-limiting exemplary embodiment, the ladder extending mechanism 116 further includes a third pulley 195 dynamically disposed at the rear face 123 of the frame 11 and mated to the posterior section 121 of the lever 120, a fourth pulley 124 rotatably anchored at the rear face 123 of the frame 11, and a second rope 125 having a proximal end 126 rotatably anchored to the first fire-simulating mechanism 15'. Such second rope 125 further has a distal end 192 statically anchored to the rear face 123 of the frame 11 such that the second rope 125 is rotatably engaged with the third pulley 195 and the fourth pulley 124. Advantageously, the proximal end 126 of the second rope 125 is caused to wind about the first fire-simulating mechanism 15' when the first fire-simulating mechanism 15' is caused to rotate in the first rotational direction 119 and thereby causes the lever 120 and the ladder 115 to synchronously articulate upward 127, 187 towards raised positions 118, 128, respectively. Conversely, the proximal end 126 of the second rope 125 is caused to unwind about the first fire-simulating mechanism 15' when the first fire-simulating mechanism 15' is caused to rotate in an opposite second rotational direction 129 and thereby causes the lever 120 and the ladder 115 to synchronously articulate downward 127a, 187a towards lowered positions 178, 188, respectively.

Of course, the second rope 125 may be elastic and calibrated to provide an adequate resistive tension when the ladder 115 and lever 120 are synchronously pivoted downwardly to the lowered position 178, 188, thereby requiring less force to pivot upward 127 the ladder 115 and lever 20. Alternately, or in combination with an elastic second rope, the first fire-simulating section 15' may be spring actuated to enable the ladder 115 and lever 120 to more easily pivot upwardly 127.

In a non-limiting exemplary embodiment, the second section 13 includes a plurality of windows 150, and a rubber flap 151 positioned over an outer layer 152 of the second section 13 for directing the fluid 154 downwardly along a rear face 123 of the windows 150.

In a non-limiting exemplary embodiment, the second fire-simulating mechanism 16' is positioned at the second section 13 of the frame 11. Such a second fire-simulating mechanism 16' includes a trough 155 in fluid communication with the rubber flap 151 and affixed to a base 157 of the second section 13 wherein the trough 155 has a weep hole 158 for permitting the fluid 154 to slowly egress therefrom. A second fire-simulating panel 30 is fixedly connected to the trough 155 and extends upwardly therefrom along a substantially vertical plane adjacent to the second section 13. In this manner, fluid 154 is caused to pass through the windows and travel along the rubber flap 151 until the fluid 154 is stored into the trough 155.

In a non-limiting exemplary embodiment, the second fire-simulating mechanism 16' further includes a third rope 159 and a fourth rope 160 each having a corresponding proximal end 161, 162 statically affixed to the trough 155, a first set of pulleys 165 and a second set of pulleys 166 each rotatably supported at the rear face 123 of the frame 11, and a first weight member 168 and a second weight member 169 statically affixed to a corresponding proximal end 197, 198 of the third rope 159 and the fourth rope 160, respectively. In this manner, the second fire-simulating panel 30 is at a lowered position 171 when a weight of the fluid 154 stored in the trough 155 is greater than a combined weight of the first weight member 168 and the second weight member 169 such that the first weight member 168 and the second weight member 169 are raised to a height generally equal to the trough 155. Conversely, the second fire-simulating panel 170 is at a raised position 172 when the weight of the fluid 154 stored in the trough 155 is less than the combined weight of the first weight member 168 and the second weight member 169 such that the first weight member 168 and the second weight member 169 are lowered to a height below the trough 155.

The present disclosure further includes a method of utilizing an interactive fire safety education kit 10'. Such a method includes the steps of: providing a frame 11 including a first section 12, a second section 13 conjoined to the first section 12, and a third section 14 conjoined to the second section 13, wherein the first section 12, the second section 13 and the third section 14 are arranged in a side-by-side configuration; providing and rotatably coupling a first fire-simulating mechanism 15' to the first section 12; providing and adjustably coupling a second fire-simulating mechanism 16' to the second section 13; providing and rotatably coupling a third fire-simulating mechanism 17' to the third section 14.

The method further includes the steps of: providing a flag 18; providing a mechanism 19' capable of reciprocating the flag 18; and providing a user interface 22. The method steps continue by the user interface 22 generating an output 23 that causes selective rotational displacement of the first fire-simulating mechanism 15', selective linear displacement of the second fire-simulating mechanism 16', and selective rotational displacement of the third fire-simulating mechanism 17', respectively; and the mechanism 19' reciprocating the flag 18 along a vertical path 20' located adjacent to the third section 14 as the third fire-simulating mechanism 17' rotates in opposing rotational directions 21'.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. An interactive fire safety education kit comprising:
   a frame including
      a first section,
      a second section conjoined to said first section, and
      a third section conjoined to said second section;
   a first fire-simulating mechanism coupled to said first section;
   a second fire-simulating mechanism coupled to said second section;
   a third fire-simulating mechanism coupled to said third section;
   a flag;
   a mechanism capable of reciprocating said flag along a vertical path located adjacent to said third section as said third fire-simulating mechanism rotates in opposing rotational directions; and
   a user interface capable of generating an output that causes selective rotational displacement of said first fire-simulating mechanism, selective linear displacement of said second fire-simulating mechanism, and selective rotational displacement of said third fire-simulating mechanism, respectively.

2. The interactive fire safety education kit of claim 1, wherein said mechanism capable of reciprocating said flag comprises:
   a support pole;
   a first pulley rotatably anchored to a top end of said support pole;
   a second pulley rotatably anchored to said frame and positioned below said first pulley; and
   a first rope having a proximal end rotatably engaged about a portion of said third fire-simulating mechanism, said first rope further having a distal end statically anchored to said flag;
   wherein said first rope rotatably engages each of said first pulley and said second pulley;
   wherein opposite rotational movements of said portion of said third fire-simulating mechanism about a first horizontal axis causes said first rope to wind and unwind thereabout, respectively, such that said flag is raised and lowered along a first vertical path relative to said first horizontal axis.

3. The interactive fire safety education kit of claim 2, wherein said user interface comprises: a portable toy fire truck including
   a water pump;
   a reservoir adapted to contain water and being in communication with said water pump; and
   a discharge nozzle in communication with said reservoir;
   wherein said discharge nozzle selectively ejects fluid along a first fluid path, a second fluid path and a third fluid path engaging said first fire-simulating mechanism, said second fire-simulating mechanism, and said third fire-simulating mechanism, respectively.

4. The interactive fire safety education kit of claim 3, further comprising:
   a ladder attached to said portable toy fire truck;
   a ladder-extending mechanism capable of selectively displacing said ladder to a raised position as said third fire-simulating mechanism is caused to spin in a first rotational direction, said ladder-extending mechanism comprising
      a lever having a posterior section disposed at a rear face of said frame and an anterior section disposed at a front face of said frame, said anterior section being coupled to said ladder,
      a third pulley dynamically disposed at said rear face of said frame and mated to said posterior section of said lever;
      a fourth pulley rotatably anchored at said rear face of said frame; and
      a second rope having a proximal end rotatably anchored to said first fire-simulating mechanism, said second rope further having a distal end statically anchored to said rear face of said frame such that said second rope is rotatably engaged with said third pulley and said third fourth;
   wherein said proximal end of said second rope is caused to wind about said first fire-simulating mechanism when said first fire-simulating mechanism is caused to rotate in said first rotational direction and thereby causes said lever and said ladder to synchronously articulate upward towards raised positions, respectively;
   wherein said proximal end of said second rope is caused to unwind about said first fire-simulating mechanism when said first fire-simulating mechanism is caused to rotate in an opposite second rotational direction and thereby causes said lever and said ladder to synchronously articulate downward towards lowered positions, respectively.

5. The interactive fire safety education kit of claim 4, wherein said second section comprises:
   a plurality of windows; and
   a rubber flap positioned over an outer layer of said second section for directing said fluid downwardly along a rear face of said windows.

6. The interactive fire safety education kit of claim 5, wherein said second fire-simulating mechanism is positioned at said second section of said frame, said second fire-simulating mechanism comprising:
- a trough in fluid communication with said rubber flap and affixed to a base of said second section, said trough having a weep hole for permitting said fluid to slowly egress therefrom; and
- a second fire-simulating panel fixedly connected to said trough and extending upwardly therefrom along a substantially vertical plane adjacent to said second section;
- wherein said fluid is caused to pass through said windows and travel along said rubber flap until said fluid is stored into said trough.

7. The interactive fire safety education kit of claim 6, wherein said second fire-simulating mechanism further comprises:
- a third rope and a fourth rope each having a corresponding proximal end statically affixed to said trough;
- a first set of pulleys and a second set of pulleys each rotatably supported at said rear face of said frame; and
- a first weight member and a second weight member statically affixed to a corresponding distal end of said third rope and said fourth rope, respectively;
- wherein said second fire-simulating panel is at a lowered position when a weight of said fluid stored in said trough is greater than a combined weight of said first weight member and said second weight member such that said first weight member and said second weight member are raised to a height generally equal to said trough;
- wherein said second fire-simulating panel is at a raised position when said weight of said fluid stored in said trough is less than said combined weight of said first weight member and said second weight member such that said first weight member and said second weight member are lowered to a height below said trough.

8. An interactive fire safety education kit comprising:
- a frame including
  - a first section,
  - a second section conjoined to said first section, and
  - a third section conjoined to said second section, wherein said first section, said second section and said third section are arranged in a side-by-side configuration;
- a first fire-simulating mechanism rotatably coupled to said first section;
- a second fire-simulating mechanism adjustably coupled to said second section;
- a third fire-simulating mechanism rotatably coupled to said third section;
- a flag;
- a mechanism capable of reciprocating said flag along a vertical path located adjacent to said third section as said third fire-simulating mechanism rotates in opposing rotational directions; and
- a user interface capable of generating an output that causes selective rotational displacement of said first fire-simulating mechanism, selective linear displacement of said second fire-simulating mechanism, and selective rotational displacement of said third fire-simulating mechanism, respectively.

9. The interactive fire safety education kit of claim 8, wherein said mechanism capable of reciprocating said flag comprises:
- a support pole;
- a first pulley rotatably anchored to a top end of said support pole;
- a second pulley rotatably anchored to said frame and positioned below said first pulley; and
- a first rope having a proximal end rotatably engaged about a portion of said third fire-simulating mechanism, said first rope further having a distal end statically anchored to said flag;
- wherein said first rope rotatably engages each of said first pulley and said second pulley;
- wherein opposite rotational movements of said portion of said third fire-simulating mechanism about a first horizontal axis causes said first rope to wind and unwind thereabout, respectively, such that said flag is raised and lowered along a first vertical path relative to said first horizontal axis.

10. The interactive fire safety education kit of claim 9, wherein said user interface comprises: a portable toy fire truck including
- a water pump;
- a reservoir adapted to contain water and being in communication with said water pump; and
- a discharge nozzle in communication with said reservoir;
- wherein said discharge nozzle selectively ejects fluid along a first fluid path, a second fluid path and a third fluid path engaging said first fire-simulating mechanism, said second fire-simulating mechanism, and said third fire-simulating mechanism, respectively.

11. The interactive fire safety education kit of claim 10, further comprising:
- a ladder attached to said portable toy fire truck;
- a ladder-extending mechanism capable of selectively displacing said ladder to a raised position as said third fire-simulating mechanism is caused to spin in a first rotational direction, said ladder-extending mechanism comprising
  - a lever having a posterior section disposed at a rear face of said frame and an anterior section disposed at a front face of said frame, said anterior section being coupled to said ladder,
  - a third pulley dynamically disposed at said rear face of said frame and mated to said posterior section of said lever;
  - a fourth pulley rotatably anchored at said rear face of said frame; and
  - a second rope having a proximal end rotatably anchored to said first fire-simulating mechanism, said second rope further having a distal end statically anchored to said rear face of said frame such that said second rope is rotatably engaged with said third pulley and said third fourth;
- wherein said proximal end of said second rope is caused to wind about said first fire-simulating mechanism when said first fire-simulating mechanism is caused to rotate in said first rotational direction and thereby causes said lever and said ladder to synchronously articulate upward towards raised positions, respectively;
- wherein said proximal end of said second rope is caused to unwind about said first fire-simulating mechanism when said first fire-simulating mechanism is caused to rotate in an opposite second rotational direction and thereby causes said lever and said ladder to synchronously articulate downward towards lowered positions, respectively.

12. The interactive fire safety education kit of claim 11, wherein said second section comprises:

a plurality of windows; and a rubber flap positioned over an outer layer of said second section for directing said fluid downwardly along a rear face of said windows.

13. The interactive fire safety education kit of claim 12, wherein said second fire-simulating mechanism is positioned at said second section of said frame, said second fire-simulating mechanism comprising:

a trough in fluid communication with said rubber flap and affixed to a base of said second section, said trough having a weep hole for permitting said fluid to slowly egress therefrom; and a second fire-simulating panel fixedly connected to said trough and extending upwardly therefrom along a substantially vertical plane adjacent to said second section;

wherein said fluid is caused to pass through said windows and travel along said rubber flap until said fluid is stored into said trough.

14. The interactive fire safety education kit of claim 13, wherein said second fire-simulating mechanism further comprises:

a third rope and a fourth rope each having a corresponding proximal end statically affixed to said trough;

a first set of pulleys and a second set of pulleys each rotatably supported at said rear face of said frame; and a first weight member and a second weight member statically affixed to a corresponding distal end of said third rope and said fourth rope, respectively;

wherein said second fire-simulating panel is at a lowered position when a weight of said fluid stored in said trough is greater than a combined weight of said first weight member and said second weight member such that said first weight member and said second weight member are raised to a height generally equal to said trough;

wherein said second fire-simulating panel is at a raised position when said weight of said fluid stored in said trough is less than said combined weight of said first weight member and said second weight member such that said first weight member and said second weight member are lowered to a height below said trough.

15. A method of utilizing an interactive fire safety education kit, said method comprising the steps of:

providing a frame including a first section, a second section conjoined to said first section, and a third section conjoined to said second section, wherein said first section, said second section and said third section are arranged in a side-by-side configuration;

providing and rotatably coupling a first fire-simulating mechanism to said first section;

providing and adjustably coupling a second fire-simulating mechanism to said second section;

providing and rotatably coupling a third fire-simulating mechanism to said third section;

providing a flag;

providing a mechanism capable of reciprocating said flag;

providing a user interface;

said user interface generating an output that causes selective rotational displacement of said first fire-simulating mechanism, selective linear displacement of said second fire-simulating mechanism, and selective rotational displacement of said third fire-simulating mechanism, respectively; and said mechanism reciprocating said flag along a vertical path located adjacent to said third section as said third fire-simulating mechanism rotates in opposing rotational directions.

* * * * *